United States Patent
Kelly et al.

[11] Patent Number: 5,999,866
[45] Date of Patent: Dec. 7, 1999

[54] INFRASTRUCTURE INDEPENDENT POSITION DETERMINING SYSTEM

[75] Inventors: Alonzo James Kelly, Pittsburgh; Robert Craig Coulter, Apollo, both of Pa.

[73] Assignee: Carnegie Mellon University, Pittsburgh, Pa.

[21] Appl. No.: 08/744,053

[22] Filed: Nov. 5, 1996

[51] Int. Cl.⁶ .................................................. G06F 15/50
[52] U.S. Cl. .................. 701/28; 318/587; 382/1
[58] Field of Search .................. 701/23, 24, 28, 701/200, 26; 180/167, 168, 169; 318/587, 568.16, 567; 901/1, 3

[56] References Cited

U.S. PATENT DOCUMENTS

| | | | |
|---|---|---|---|
| 3,788,201 | 1/1974 | Abell | 95/1.1 |
| 4,647,784 | 3/1987 | Stephens | 250/559.3 |
| 4,727,492 | 2/1988 | Reeve et al. | 701/25 |
| 4,799,267 | 1/1989 | Kamejima et al. | 382/1 |
| 4,847,769 | 7/1989 | Reeve | 701/23 |
| 4,847,773 | 7/1989 | van Helsdingen et al. | 701/200 |
| 4,965,499 | 10/1990 | Taft et al. | 318/568.11 |
| 4,979,113 | 12/1990 | Roberts et al. | 701/24 |
| 5,067,081 | 11/1991 | Person | 364/444 |
| 5,081,585 | 1/1992 | Kurami et al. | 364/424.02 |
| 5,109,340 | 4/1992 | Kanayama | 701/25 |
| 5,170,352 | 12/1992 | McTamaney et al. | 701/26 |
| 5,245,422 | 9/1993 | Borcherts et al. | 358/103 |
| 5,249,126 | 9/1993 | Hattori | 701/77 |
| 5,305,217 | 4/1994 | Nakamura et al. | 701/25 |
| 5,307,278 | 4/1994 | Hermans et al. | 701/217 |
| 5,339,241 | 8/1994 | Fujimori et al. | 364/424.02 |
| 5,363,305 | 11/1994 | Cox et al. | 701/200 |
| 5,369,589 | 11/1994 | Steiner | 701/200 |
| 5,378,969 | 1/1995 | Haikawa | 318/568.12 |
| 5,436,839 | 7/1995 | Dausch et al. | 364/449 |
| 5,525,883 | 6/1996 | Avitzour | 318/587 |
| 5,815,825 | 9/1998 | Tachibana et al. | 701/23 |

FOREIGN PATENT DOCUMENTS

| | | |
|---|---|---|
| 0 050 101 A1 | 1/1981 | European Pat. Off. . |
| 0 190 742 A2 | 5/1986 | European Pat. Off. . |
| 0 390 052 A2 | 3/1990 | European Pat. Off. . |
| 0 390 052 A3 | 3/1990 | European Pat. Off. . |
| 0 706 105 A1 | 2/1995 | European Pat. Off. . |
| 0 681 230 A1 | 4/1995 | European Pat. Off. . |
| 41 38 270 A1 | 5/1993 | Germany . |

OTHER PUBLICATIONS

Richard L. Marks, et al., Real–Time Video Mosaicking of the Ocean Floor, pp. 229–241, IEEE Journal of Oceanic Engineering, vol. 20, No. 3, Jul., 1995.

Stephen D. Fleischer et al., Improved Real–Time Video Mosaicking of the Ocean Floor, pp. 1935–1944, Proceedings of the 1995 Oceans Conference, MTS/IEEE, Oct. 1995.

Richard Marks, et al., Real–Time Video Mosaicking of the Ocean Floor, pp. 21–27, Proceedings of IEEE Symposium on Autonomous Underwater Vehicle Technology, Cambridge MA, Jul. 1994.

*Primary Examiner*—Virna Lisa Ng
*Assistant Examiner*—Arthur D. Donnelly
*Attorney, Agent, or Firm*—Kirkpatrick & Lockhart LLP

[57] ABSTRACT

A method and apparatus for determining position is comprised of the steps of capturing an image related to the present position and comparing the captured image with one or more images from an iconic map. The iconic map is a map which stores images of a substantially flat surface over which a robot or vehicle is to operate. The stored images contain randomly occurring characteristics such as the fibers in a carpet, brush marks appearing in brushed concrete, and the like. Although such naturally occurring features are essentially random, when analyzed in small enough images, each image becomes unique. The position is determined based upon the image from the map which provides the highest correlation. Speed, wheel slippage, and other parameters can be calculated using the disclosed method.

20 Claims, 4 Drawing Sheets

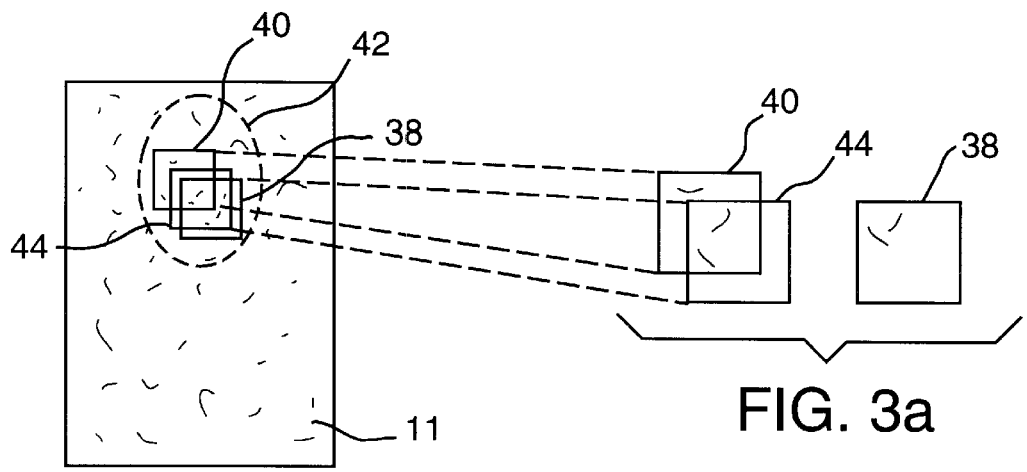
FIG. 3
FIG. 3a
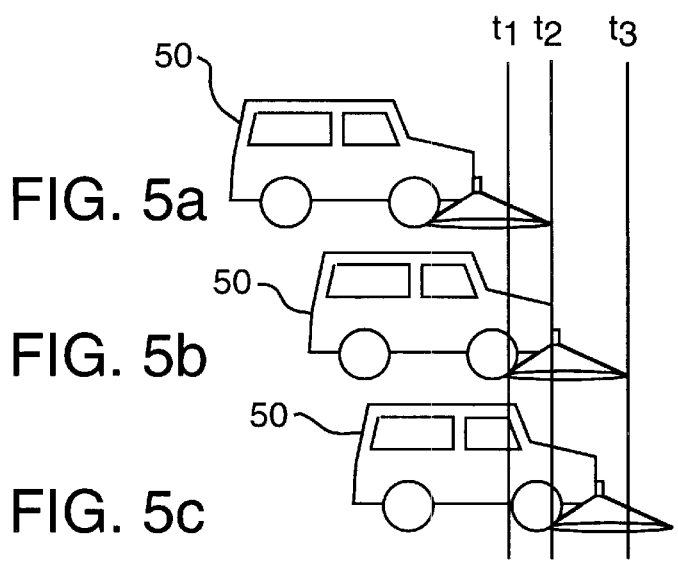
FIG. 5a
FIG. 5b
FIG. 5c
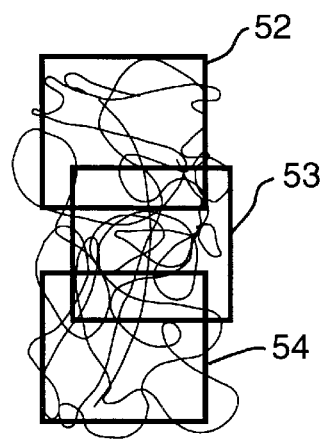
FIG. 6

INFRASTRUCTURE INDEPENDENT POSITION DETERMINING SYSTEM

BACKGROUND OF THE INVENTION

1. Field of the Invention

The present invention is directed generally to position determining systems used for navigation and, more particularly, to systems of the type in which vision is used by a robot to determine its position so that it may autonomously travel and perform preprogrammed tasks within a particular environment.

2. Description of the Background

High repeatability, position estimation is a key technology for mobile robotics applications such as seaport and manufacturing facility automation. Near term operations in those applications requires positioning repeatabilities of approximately three millimeters. Three millimeters represents a significant improvement over the current industry standard of approximately five millimeters. The three millimeter repeatability must be achieved at an acceptable cost per unit. High end laser and inertial units are capable of meeting the technical specifications. However, their $20,000 to $100,000 plus per unit cost is far too high to be economically justifiable for most applications. Thus, a significant tradeoff exists between price and performance which prohibits flat floor mobile robotics companies from servicing existing demands in the market.

The least expensive positioning systems are so-called dead reckoning systems produced from low cost wheel encoders and a compass. Those systems produce an estimate of position based on the integration of rate measurements. Thus, they suffer from significant error accumulation in the estimate. High end dead reckoning systems, such as military grade inertial systems, reduce that problem by using rate sensors with very low error bias, but at a cost that is order of magnitudes higher than those acceptable to flat floor markets.

One low cost alternative is to combine the low cost dead reckoning system with a triangulation system, which can be used to reset the accumulated error by calculating a fix on the position. Triangulation systems do not perform integration, and thus are not affected by sensor bias. However, they suffer from dilution of precision problems that arise during the conversion of their measurements to the coordinate system of interest, e.g., a range and orientation of the sensor is converted to Cartesian space (xy). Triangulation systems take measurements with respect to external beacons or other items of infrastructure which make them vulnerable to sabotage. In certain industrial applications, sabotage is a key concern. Furthermore, the placement of beacons or other items of infrastructure represents a significant additional overhead cost to the end user. In certain applications, approximately one-third of the total cost of the system is due to the installation of beacons or other items of infrastructure.

U.S. Pat. No. 4,847,769 entitled "Automated Vehicle Drift Correction" discloses a navigation system which carries out a dead reckoning calculation of the vehicles position based on inputs from sensors and the motion of a steering wheel in the preceding time interval. U.S. Pat. No. 5,307,278 entitled "Method Of Determining The Position Of A Vehicle, Arrangement For Determining The Position Of A Vehicle, As Well As A Vehicle Provided With Such An Arrangement", also relies upon dead reckoning.

U.S. Pat. No. 5,170,352 entitled "Multi-Purpose Autonomous Vehicle With Path Plotting" is an example of an autonomous vehicle which operates in conjunction with a plurality of laser, sonic, and optical sensors. Such sensors detect targets and obstacles in the work area and provide coded signals which direct vehicles over a most expedient route to a target while avoiding any obstacles.

U.S. Pat. No. 5,363,305 entitled "Navigation System For A Mobile Robot" discloses an apparatus for creating and maintaining a map of an environment the mobile autonomous robot is to transverse. A credibility measure is increased or decreased whenever a map feature assigned to a location matches or does not match, respectively, a geometric beacon corresponding to such location.

U.S. Pat. No. 4,979,113 entitled "Automated Vehicle Control" discloses a system in which data identifying locations of notational points on the floor of the area of interest are entered into a computer together with a look-up table specifying pairs of those points between which movements of vehicles may be required.

U.S. Pat. No. 4,847,773 entitled "System For Navigating A Free-Ranging Vehicle" discloses a system in which the surface to be traversed carries a grid of passive marker elements with the vehicle being provided with detectors for detecting such elements.

U.S. Pat. No. 4,647,784 entitled "Vehicle Guidance and Control System" discloses a system in which vehicles determine their own position in relation to marker boards consisting of patterns of reflective coded strips by scanning a narrow laser beam in a predetermined direction across the strips. Positions can be determined by using triangulation.

U.S. Pat. No. 4,727,492 entitled "Vehicle Control And Guidance System" discloses a vehicle guidance system which uses dead reckoning to predict the position of the vehicle. At the end of predetermined intervals, the dead reckoning is corrected by an independent fixed-target detection system using a scanning laser.

Other low cost alternatives are based on the use of vision systems to take range readings, e.g., stereo vision, of known features in an environment, such as doorways and room corners. A position is determined based on such readings. Although that method does not require the placement of infrastructure, it suffers from the significant problem of shape dependence. Briefly, what a feature looks like depends upon the angle from which it is viewed. That problem entails such computational complexity that commercially practical vision systems that operate on natural features have never been produced.

Thus, while substantial work has been directed at solving the aforementioned problems, it is seen from the prior art discussed above that such problems have not been solved. Many position determining systems are still dependent upon infrastructure which is expensive. Furthermore, once the infrastructure is in place, the facility can usually not be modified without the additional expense of modifying the infrastructure. Additionally, robots relying upon such infrastructure can easily be sabotaged.

Dead reckoning systems do not provide the repeatability required by today's commercial application. Combining dead reckoning systems with some form of triangulation or other correction method introduces infrastructure, and all of the problems associated therewith.

Vision systems, which can provide higher accuracy than dead reckoning systems and which are typically free of artificially imposed infrastructure, are difficult and costly to implement. If a feature is unrecognizable because it is approached from a different angle, the robot may become disorganized and cease to function. Thus, the need exists for a position determining system which is highly accurate, independent of all infrastructure, relatively immune to sabotage, and which provides the high repeatability demanded in today's marketplace at a competitive cost.

SUMMARY OF THE INVENTION

The present invention is directed to a method and apparatus for determining position, comprising the steps of capturing an image related to the present position. The image related to the present position is compared with one or more images from an iconic map. The position is determined based upon the image from the map which provides the highest correlation.

The iconic map of the present invention is a map which stores features from the particular environment in which the robot is to operate. Features as used herein refers to randomly occurring characteristics such as the fibers in a carpet, brush marks appearing in brushed concrete, and the like. Such randomly occurring natural features occur in all surfaces except shiny metallic surfaces or other surfaces where steps have been taken to remove such naturally occurring features. Although such naturally occurring features are essentially random, when analyzed in small enough images, each image becomes unique. That is, no two images will have exactly the same distribution of randomly occurring features such as brush marks in concrete. Thus, as used herein, the word features does not refer to the kind of features referred to in the prior art, e.g. a doorway, a stairway, etc.

The method and apparatus of the present invention may be employed in a number of ways. If the initial position is known, the vehicle may follow a map of features to move from its initial position to a desired location. Alternatively, to save time and computing resources, a dead reckoning system may be used to provide a gross estimate of the robot's position. A plurality of images within a predetermined area bounding the gross location are compared to an image of the actual location. The image within the searched boundary that provides the highest correlation with the image of the actual location is selected and identified as the actual location of the robot.

The method and the apparatus of the present invention may be used to allow a robot to navigate within a predetermined area. Additionally, because the robot can be precisely positioned, i.e. within three millimeters or better of a desired location, the robot may be equipped with arms, tools, or other devices to perform a task upon reaching the assigned location. The precise repeatability results from the fact that the correlation between images allows the position of the robot to be precisely determined. The comparison may be performed using any standard mathematical technique such that substantial computing resources are not required. Furthermore, the hardware needed to produce the image which is compared with images from a map is standard imaging hardware which is relatively inexpensive in today's market. Thus, the apparatus of the present invention can be produced in a cost effective manner yet provide repeatable placement of the robot within three millimeters of a desired position. The operation of the robot does not depend upon infrastructure or the ability to recognize gross features such as doorways, stairwells, etc. Because no infrastructure such as beacons, markers, etc. is required, the overall cost of the system is competitive with existing navigational systems. Finally, because the system relies upon randomly occurring natural features, it is extremely difficult to sabotage the robot. Those advantages and benefits of the present invention, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein:

FIG. 3 illustrates the naturally occurring features in a floor or other substantially flat surface;

FIG. 3a illustrates two images from the flat surface of FIG. 3 which are correlated with an image representative of the actual position of the robot;

FIGS. 5a, 5b, and 5c illustrate the position of a vehicle at times $t_1$, $t_2$, and $t_3$, respectively; and FIG. 6 illustrates the images of the road at times t1, t2, and t3, respectively.

DESCRIPTION OF THE PREFERRED EMBODIMENTS

Figure 1:
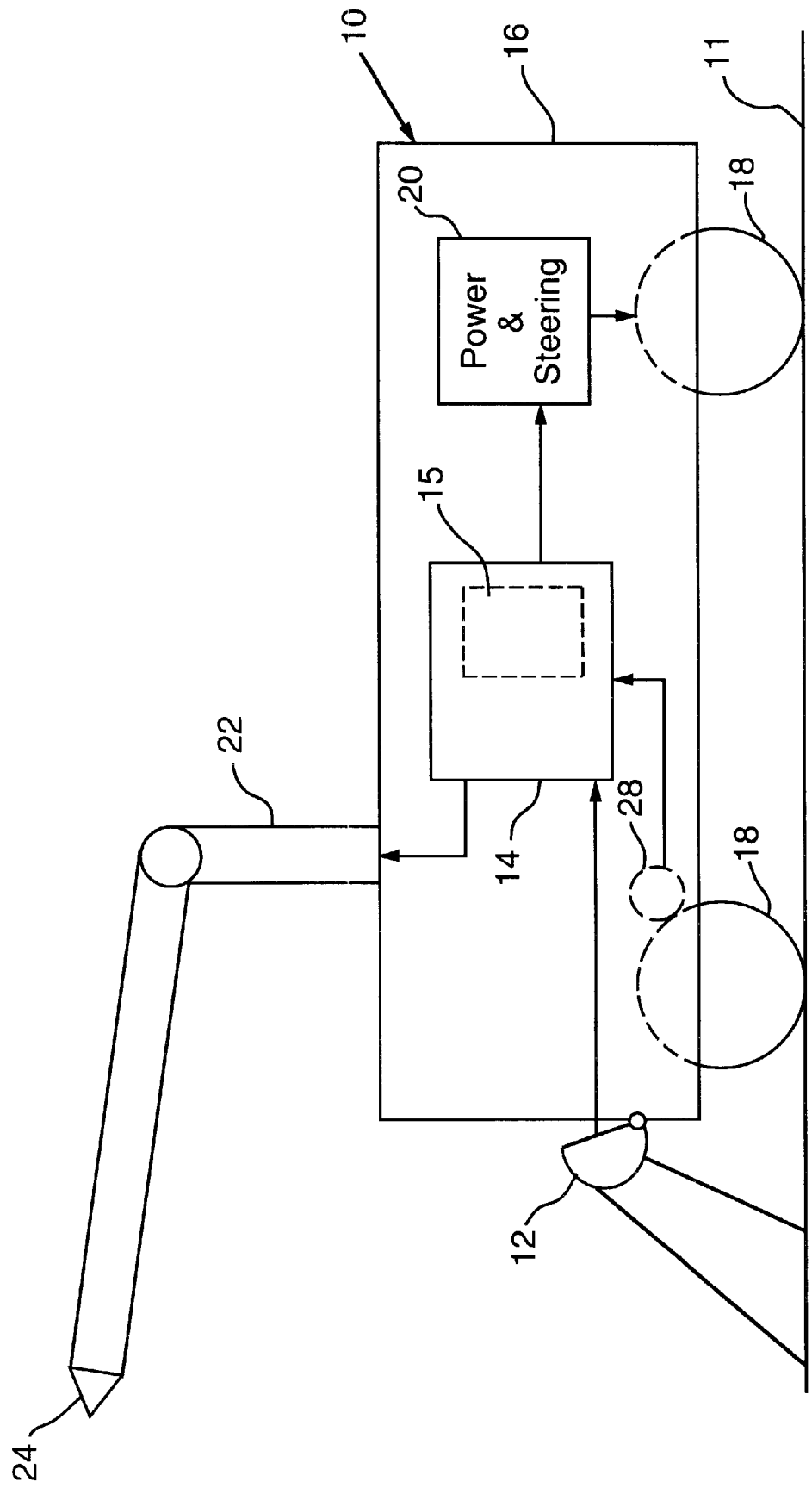
FIG. 1 illustrates a robot carrying a vision system providing input to a position determining system constructed according to the teachings of the present invention.

FIG. 1 illustrates a robot 10 carrying a vision system 12 which provides an input signal to a microprocessor based system 14. Part of the microprocessor based system 14 is a position estimator 15 preferably implemented in software and constructed according to the teachings of the present invention. The robot 10 is conventional in construction and is comprised of a frame 16 and a plurality of wheels 18. Certain of the wheels 18 receive power and steering commands from a power and steering module 20 under control of the microprocessor based system 14 so that the robot 10 is capable of self propulsion.

The frame 16 may carry a robot arm 22 which may carry a tool 24 on its end for performing various functions under the control of the microprocessor based system 14. When the robot 10 arrives at a predetermined location, which position is known by virtue of signals output by position estimator 15, the arm 22 and tool 24 may be manipulated according to stored programs to perform predetermined functions such as picking up a work piece, positioning the work piece, inserting a bolt or screw, lifting a pallet, returning a box to storage, vacuuming a carpet, emptying a trash can, etc. For certain tasks, it is necessary that the robot 10 be precisely positioned, i.e. positioned with a repeatability of three millimeters or less. The frame 16 may also carry an odometer 28 which provides a signal input to position estimator 15 for purposes of performing calculations, such as dead reckoning, as will be described hereinbelow.

The vision system 12 may be of any commercially available type which is comprised of a camera and means for digitizing the image produced by the camera. The digitized image is then input to the position estimator 15. The camera 12 is mounted in a manner so that it may be focused straight down or at an angle with respect to a substantially flat surface 11. The camera 12 may be carried by the frame 16 at the bottom thereof between wheels 18 to make it more difficult to interfere with the operation of robot 10.

The reader should recognize that the robot frame 16, wheels 18, power and steering module 20, robot arm 22, tool 24, odometer 28, and the vision system 12 are of standard construction and operation. Accordingly, those elements are not further described herein. The inventive features of the present invention lie within the position estimator 15 and the manner in which the position estimator 15 produces signals used by the other components carried by the robot 10.

Figure 2:
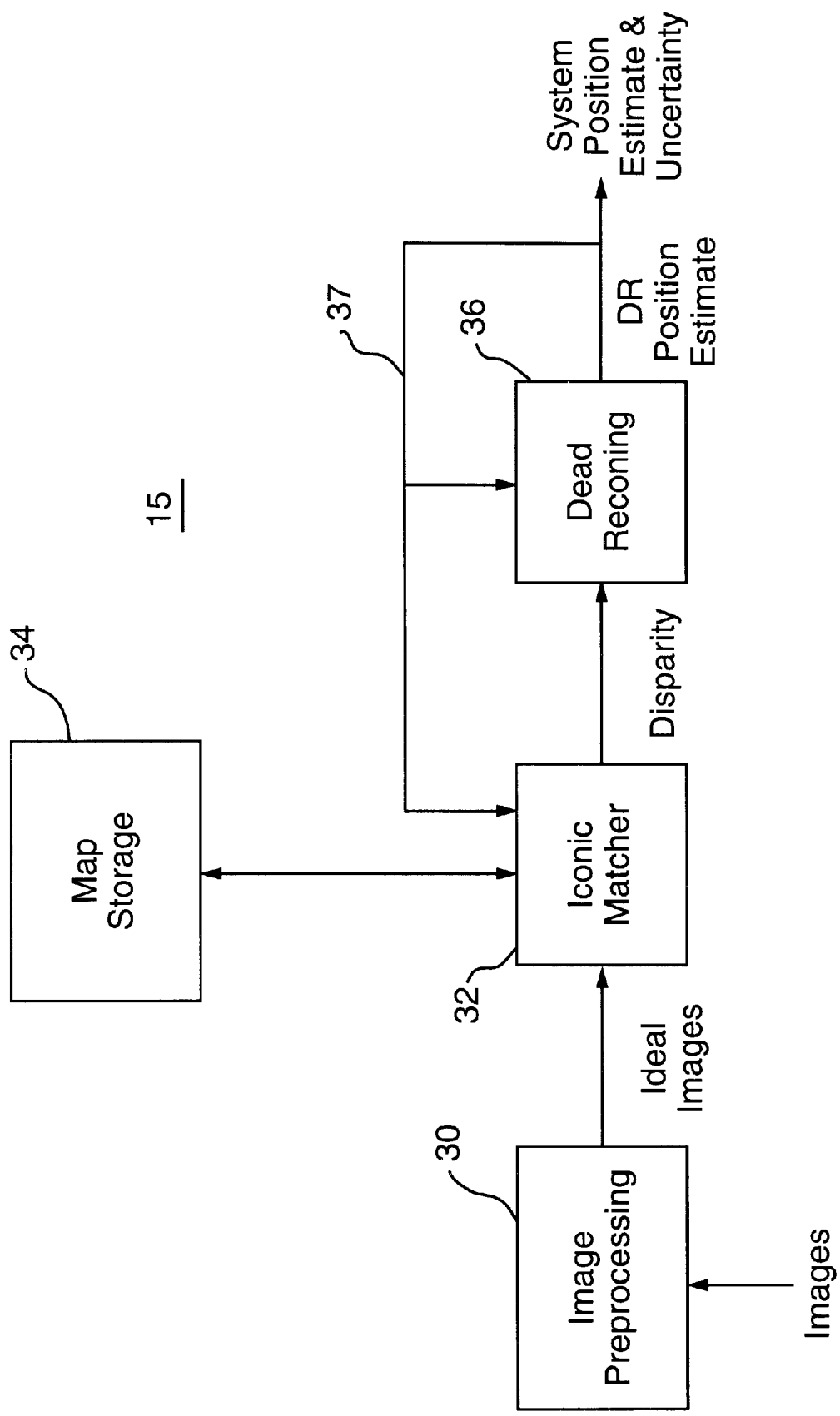
FIG. 2 is a block diagram illustrating the basic components of a position determining system constructed according to the teachings of the present invention.

Turning to FIG. 2, a block diagram of the position estimator 15 is illustrated. The images produced by the vision system 12 are digital images which are input to an image preprocessor 30. The image preprocessor 30 is comprised of a set of standard preprocessing routines which remove shadows, enhance texture, and remove lens distortion. Bias and scale may also be removed. Such image preprocessing is well-known in the art and is therefore not further described.

The output of image preprocessor 30 represents ideal images which are input to an iconic matcher 32. The iconic matcher 32 performs a correlation between the ideal images and one or more images retrieved from a map storage area 34. Map storage area 34 contains an iconic map which may be thought of as a single electronic picture of the entire surface upon which the robot moves. The manner in which the image is retrieved depends upon the mode of operation of the system as will be described in greater detail hereinbelow. In general, if the position of the robot can be estimated by dead reckoning or from an independent signal representing positioning information, then the portion of the map representative of that estimated position is supplied to the iconic matcher 32 for correlation with the ideal images. Alternatively, if the starting position with respect to the stored map is known, then a lock may be kept on the position so that successive ideal images are compared with successive images from the map in a manner such that the robot continuously knows its position as shown by the feedback loop 37. Those modes of operation will be described in greater detail herein below.

The iconic matcher 32 uses substantially all of the data in both the real image, which is representative of the actual position of the robot, and substantially all of the data from the image selected from the map, which is representative of the position where the robot believes it is located. One way to use all or substantially all of the data is through a cross correlation function. However, other mathematical techniques may be used such as a sum of absolute differences, sum of squared differences, a sign correlation, etc. The particular mathematical technique used is of no particular significance to the overall theory of the present invention. The particular technique selected may have an impact on the operation of the present invention, depending upon how the particular mathematic technique is implemented in the software. The iconic matcher 32 outputs a signal which is a disparity vector. In one mode of operation, if the disparity vector has a value of zero, then the robot is at the position represented by the image taken from map storage 34.

The last element illustrated in FIG. 2 is the dead reckoning element 36. The dead reckoning element 36 is a set of routines which compute the robot's position by adding successive disparity vectors to an initial position. The dead reckoning element 36 also establishes the degree of uncertainty in the position estimate.

The position estimator 15 operates by using naturally occurring features in flat floors as landmarks. Concrete, asphalt, tile, carpet, and many other surfaces all contain features such as cracking patterns, wave-like patterns from the original material flow, small rock inclusions, stains and discolorations, nicks, scratches, fibers, and the like. Such natural features are usually small and random, which make them uniquely identifiable in an image taken close to the floor.

Turning to FIG. 3, a portion of the floor 11 is illustrated. Assume that the robot 10 is located at a certain starting location on floor 11 and takes an image 38 of the floor at that location. The robot then moves to some other location. Upon the robot's 10 return to the same approximate location, the robot 10 takes a second image 40. Image 40 is then used to define a target area 42, which is an ellipse of uncertainty. The target area is then broken up into a plurality of images, two of which, 40 and 44, are illustrated in FIG. 3a. Images 40, 44, and all of the other images from target area 42, are matched with image 38 using, according to a preferred embodiment, a correlation function to determine the transform between pairs of images. The image from the target area, in this example 44, having the highest correlation with the original image 38 provides an indication of how far off the robot is from the original position as represented by image 38. The likely dimensions and stand-off distances of such an image correlation process quickly show that submillimeter repeatabilities are calculable.

The method described above in conjunction with FIGS. 3 and 3a is only one of a variety of methods by which the present invention may be operated. The method as detailed above required the mobile robot to return to within an image frame of its original location. If, instead, images of an entire building were taken, then the system 15 could systematically search through those images calculating correlations. Sufficient storage is currently available with current technologies so that one square kilometer can be represented. One square kilometer represents approximately 10 gigabytes, before the use of data reduction techniques. If an approximate position is available, then the search can be pruned to within an area covered by the position uncertainty ellipse 42. Even with a fairly poor independent position indication, the search can be pruned to one or a few images.

Figure 4:
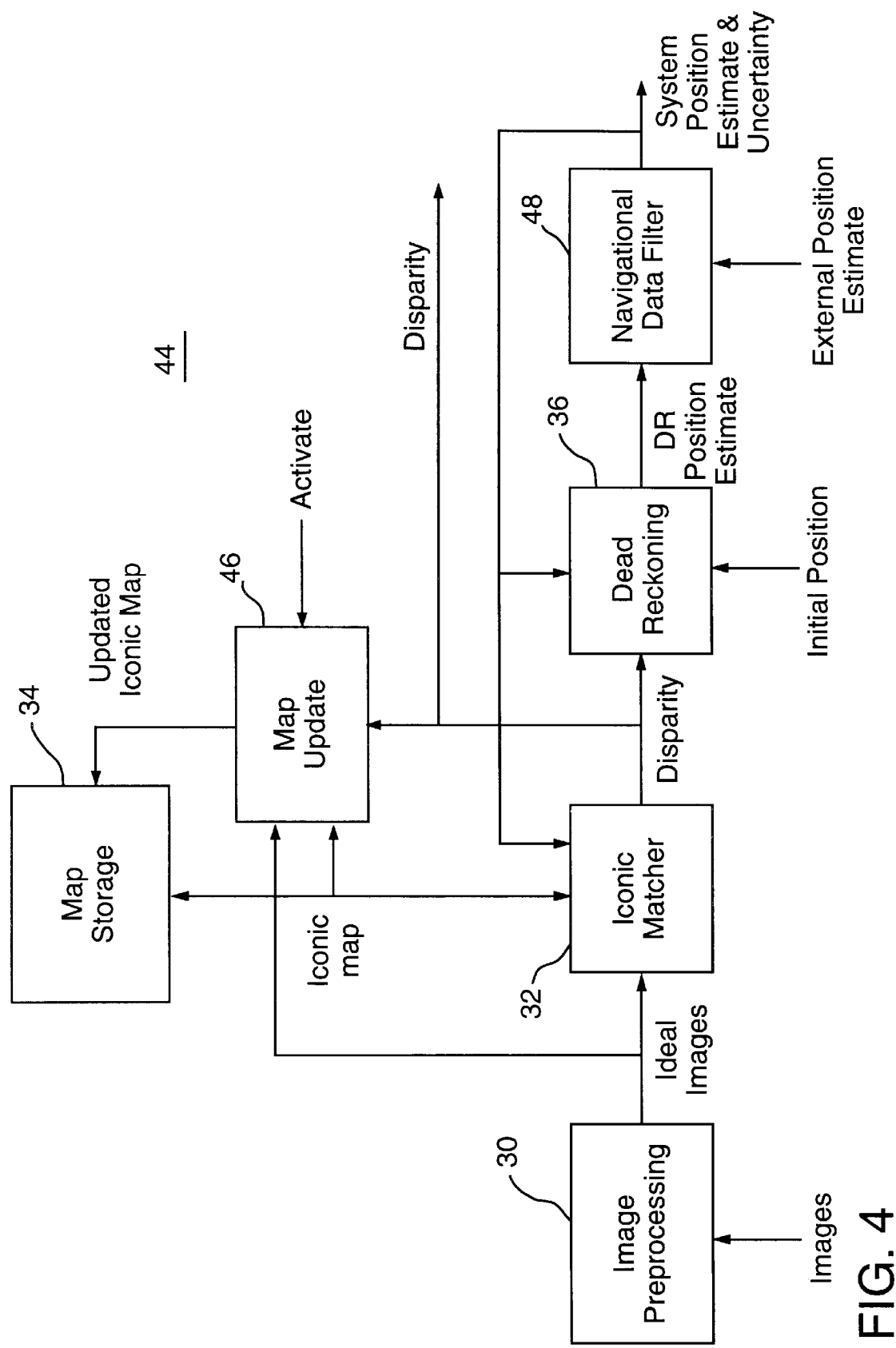
FIG. 4 is a block diagram illustrating a position determining system constructed according to the teachings of the present invention and which has mapping capability.

Turning to FIG. 4, a position estimator 44 constructed according to the teachings of the present invention is illustrated. The position estimator 44 is similar to the position estimator 15, and elements performing the same function are provided with the same reference numerals. In FIG. 4, the system 44 includes a map update element 46. The map update element 46 is a set of routines which adds images to the map when the position estimator 44 is operating in the mapping mode. The image is shifted by the negative of the disparity vector and then placed into map storage 34. Map update element 46 may be activated so as to create a map or may be activated when it is necessary to update a map because of changed surface features.

A navigational data filter 48 is provided which is a set of routines that process all available information to provide the best possible estimate of position. A Kalman filter is one possible implementation, but any technique for estimation of state from various measurements will suffice.

Before discussing the various modes of operation of position estimator 44, it is useful to identify the data used within position estimator 44. The initial position which is input into dead reckoning element 36 is the position to be associated with where the robot 10 was started. In the mapping mode, the initial position serves to locate the entire map. It can be an input to the system or a default value can be used. In the navigation mode, the initial position is used to restrict the initial search for a match with the iconic map. Thereafter, the system maintains a lock on the map as the robot moves such that only a small amount of searching is required for each successive ideal image.

An external position estimate is input to navigational data filter 48. The external position estimate is an estimate of system position that it supplied externally by a wholly separate positioning device such as odometer 28. The external position estimate is used as a redundant position indicator in both navigation and mapping modes. In both cases it is an optional input, but system absolute accuracy is expected to be improved when an external estimate is available.

The system position estimate is the estimate of position provided by the system, and the primary system output. The disparity output is the vector difference between the current estimate of vehicle position and the true position of the image in the map. When no external position is supplied, it measures differential displacement, which is easily converted to velocity by dividing by the time increment. If an external position is supplied, it is a measure of wheel slippage. The position estimate may be used by other programs in microprocessor 14 to determine a course as is known in the art.

The position estimator 44 may be operated in a variety of modes. One mode of operation can be either mapping or navigation. Those modes are distinguished only by what is considered known and unknown. In the mapping mode, the position estimator 44 is being taught the map which is being stored in map storage 34. In that mode, the position estimate is supplied or internally generated and the map is created. In the navigation mode, it is the map which is supplied and the position which is created. In operation, the position estimator 44 is akin to a record player. The record is written only once by the position estimator 44 but can be read many times when the position estimator 44 is in the navigator mode. If the map update element 46 is activated, the system is in the mapping mode, otherwise it is in the navigation mode.

The navigation mode has two submodes, absolute and relative. In the absolute mode, the externally stored iconic map is used by the iconic matcher 32. In the relative mode, the last ideal image is correlated with the current ideal image. It is expected that the relative submode will exhibit poorer absolute accuracies than the absolute mode.

The position estimator 44 can be operated in an aided or unaided mode. At all times, the estimator 44 can compute its position simply by adding each successive disparity vector to the initial position. That is classically known as dead reckoning. In the aided mode, the navigational data filter element 48 and the external position estimate are activated.

The absolute and the relative modes are distinguished by the optional initial position input. If the initial position is supplied, the system can generate position relative to an external reference. If not, a default initial position is used. The default is usually zero, in which case the system reports position relative to the point where power was first applied to the system.

The estimator 44 can also be operated in a differential enabled or differential disabled mode. Those mode states are distinguished by the availability of the optional disparity output. At present, that signal can be used as a velocity signal, as a measure of wheel slip, or for such other purposes as desired by the user. That aspect of the invention is described in further detail in conjunction with FIGS. 5a, 5b, 5c, and FIG. 6.

In FIGS. 5a, 5b, and 5c, the position of a vehicle 50 carrying a system 44 of the type illustrated in FIG. 4 is illustrated at times $t_1$, $t_2$, and $t_3$. In FIG. 6, an image 52 taken at time $t_1$, an image 53 taken at time $t_2$, and an image 54 taken at time $t_3$ are illustrated. When the system 44 is operated in the differential enable mode, the disparity signal is provided as an output. When iconic matcher 32 is operated in a mode so as to compare successive images, e.g. comparing image 53 to image 52, comparing image 54 to image 53, etc., an indication of the actual distance traveled can be ascertained from the disparity signal.

The disparity signal can be used to calculate a number of parameters. For example, the distance traveled, which is the spatial difference between frames 52 and 53, over a known period of time provides an indication of speed. If the distance traveled as determined by system 44 is compared to the distance traveled as indicated by an odometer, any difference between the two calculations indicates wheel slippage. Thus, the concepts of the present invention as set forth in the disclosed method and apparatus can be used for purposes other than navigation.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A method of determining a present position of an object relative to a surface, the surface having a plurality of randomly occurring features distributed thereon, comprising the steps of:

capturing an image of the surface containing a distribution of the features related to the present position of the object relative to the surface;

comparing the distribution of the features from said captured image to at least one distribution of the features from at least one image stored in a map, the at least one distribution in said at least one stored image being representative of a known position relative to the surface; and determining the present position of the object relative to the surface based on said comparing step.

2. The method of claim 1 wherein said comparing step includes the step of comparing the distribution of the features from said captured image to a plurality of distributions of the features from a plurality of images taken from said map, each of the plurality of distributions being representative of a known position relative to the surface, and wherein said determining step includes the step of selecting one of said plurality of images based on a degree of correlation between the distribution of said features from said captured image and each of the plurality of distributions of said features from said plurality of images.

3. The method of claim 2 additionally comprising the step of estimating the present position of the object, and wherein said plurality of images are selected based on said estimated position.

4. The method of claim 3 additionally comprising the step of identifying a target area around said estimated position, and wherein said plurality of images are selected from said target area.

5. The method of claim 2 additionally comprising the step of maintaining a lock on a stored image containing a distribution of the features of the surface representative of the present position of the object, and wherein said plurality of images are selected based on the lock on the stored image representative of the present position.

6. The method of claim 1 wherein said step of capturing an image includes the step of capturing a image with a camera positioned perpendicular to a substantially flat surface.

7. The method of claim 1 wherein said step of capturing an image includes the step of capturing an image with a camera positioned at an angle with respect to a substantially flat surface.

8. The method of claim 1 wherein said comparing step includes the step of correlating the distribution of the features from said captured image to the at least one distribution of the features from said at least one stored image.

9. The method of claim 8 wherein said step of correlating includes the step of performing a cross-correlation.

10. The method of claim 1 additionally comprising the step of updating the at least one image stored in the map.

11. The method of claim 1 additionally comprising the step of adding images to the map.

12. The method of claim 1 additionally comprising the step of selecting a course for the object based on the determined position.

13. Apparatus for determining a present position of an object relative to a surface, the surface having a plurality of randomly occurring features distributed thereon, comprising:

means for capturing an image of the surface containing a distribution of the features related to the present position of the object relative to the surface;

means for storing a map;

means for comparing the distribution of the features from said captured image to at least one distribution of the features from at least one image stored in said means for storing a map, the at least one distribution in said at least one stored image being representative of a known position relative to the surface; and means for determining the present position of the object in response to said means for comparing.

14. The apparatus of claim 13 wherein said means for comparing compares the distribution of the features from said captured image to a plurality of distributions of the features from a plurality of images taken from said map, each of the plurality of distributions being representative of a known position relative to the surface, and wherein said means for determining selects one of said plurality of images based on a degree of correlation between the distribution of said features from said captured image and each of the plurality of distributions of said features from said plurality of images.

15. The apparatus of claim 14 additionally comprising means for estimating the present position of the object, and wherein said plurality of images are selected based on said estimated position.

16. The apparatus of claim 15 additionally comprising means for identifying a target area around said estimated position, and wherein said plurality of images are selected from said target area.

17. The apparatus of claim 14 additionally comprising means for maintaining a lock on a stored image containing a distribution of the features of the surface representative of the present position of the object and wherein said plurality of images are selected based on the lock on the stored image representative of the present position.

18. The apparatus of claim 13 wherein said means for capturing an image includes a camera having a known relationship with a substantially flat surface.

19. The apparatus of claim 13 additionally comprising means for updating the at least one image stored in the map.

20. The apparatus of claim 13 additionally comprising means responsive to the determined position for selecting a course for the object.

* * * * *